Feb. 19, 1929.
G. DE BOTHEZAT
BIFURCATOR
Filed July 30, 1927
1,702,632
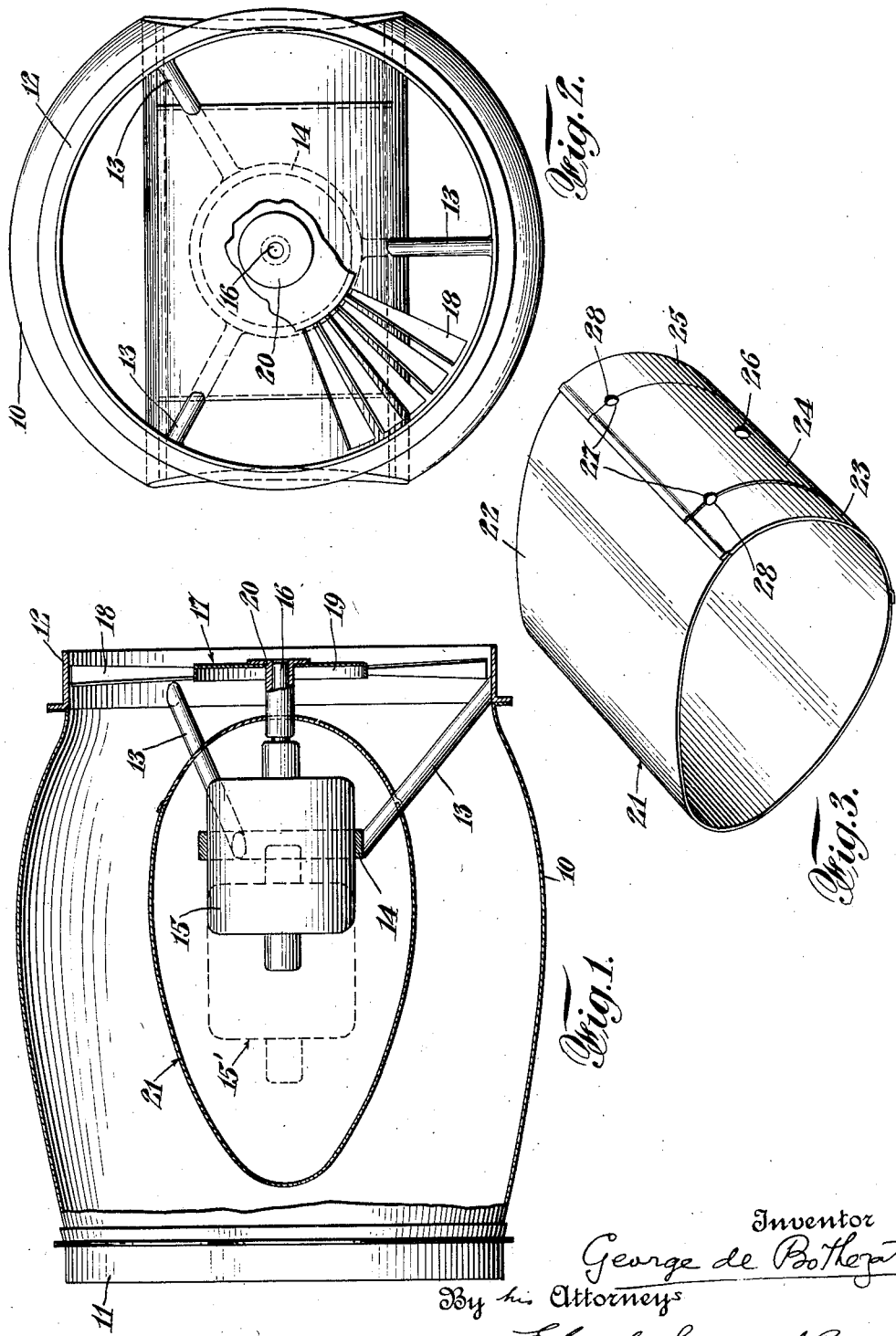
Inventor
George de Bothezat
By his Attorneys
Edwards, Sager and Bower.

Patented Feb. 19, 1929.

1,702,632

UNITED STATES PATENT OFFICE.

GEORGE DE BOTHEZAT, OF NEW YORK, N. Y.

BIFURCATOR.

Application filed July 30, 1927. Serial No. 209,443.

This invention relates to a ventilating system and particularly to a system wherein the motor for driving the fan is located within the air duct free from the action of the air stream produced by the fan and flowing through the duct which in many instances is tainted with corrosive fumes, gases or heavy dust which would attack the motor windings and in time prevent its operation.

The object of this invention is to provide a motor within an air duct directly connected to a disc pressure fan and protected from hot air within the duct which would cause overheating of the motor, and sticky vapors or gases with which the air may be charged which would destroy the windings of the motor. The protecting structure for the motor is steam line shaped or so shaped that the motor is isolated from the air stream produced by the disc fan with practically no loss of static pressure.

Further objects and advantages of the invention will be apparent from the following specification and accompanying drawings, in which Figure 1 is a sectional view of a ventilating duct and showing the invention applied thereto.

Figure 2 is a view from the fan end of the duct shown in Figure 1 with a portion of the fan broken away to show the assembly, and Figure 3 is a perspective view of the motor protecting structure before being placed within the duct.

Referring to the drawings, the illustrated embodiment of the invention comprises a cylindrical duct 10 bulged outwardly at its central portion having circular frame structures 11 and 12 at either end. Frame structure 12 is provided with inwardly extending supporting arms 13 for supporting ring 14 in the centre of the duct for supporting the motor 15 within the central portion of the duct 10. Attached directly to the shaft 16 of the motor is a disc pressure fan 17 having blades 18, boss 19 and hub 20. The fan is of substantially the same diameter as the circular frame structure 12, and is rotated therein by the operation of motor 15.

To prevent the motor 15 from being in the path of the air stream produced by the disc pressure fan 17, a protecting casing 21 extends across and is secured to the air duct 10 having both ends open for circulation of air therethrough for cooling the motor. The protecting casing is constructed of a sheet material and is somewhat elliptical in cross section or more egg shaped. This peculiar shape of the protecting casing is such that it does not interfere with the air stream produced by the disc fan causing only a very slight loss of static pressure and efficiency of the fan. The casing 21 is constructed of sections, the main section 22 having fitted thereto removable plate sections 23, 24 and 25 for permitting assembly. The central plate 24 is provided with a hole 26 for the fan hub 20 and motor shaft 16 and semi-circular openings 27 for the supporting arms 13. The end plates 23 and 25 are provided with semi-circular openings 28 which register with the openings 27 of the central plate 24. The motor 15 is located in the portion of the protecting casing 21 which is nearest to the fan. The protecting casing 21 has the largest dimension of its section of such size that the motor 15 can easily be slipped out of the ring 14 and taken out of the protecting casing 21. The motor in its removable position is represented in 15'.

While the invention is illustrated and described more particularly with reference to a disc fan located within an air duct, it is not confined thereto but is intended to cover any other uses or modifications within the scope of the appended claims.

I claim:

1. In a ventilating system, the combination with an air duct, of a motor within said duct, a fan rotated by said motor and an open ended protecting casing for said motor extending across said duct and opening through the side walls of said duct.

2. In a ventilating system, the combination with an air duct, of a motor within said duct, a fan rotated by said motor, a frame surrounding said fan and provided with a supporting means for said motor and a protecting casing within said duct around said motor extending across the full width of said duct so that said motor does not contact with the air stream produced by said fan.

3. In a ventilating system, the combination with an air duct, of a motor within said duct, a disc fan rotated by said motor and a protecting casing of elliptical or egg shape in cross section extending across said duct and opening through the side walls of said duct.

4. In a ventilating system, the combination with an air duct, of a motor within said duct, a disc fan rotated by said motor, a supporting means for said motor and a protecting casing formed of sectional plates fitted together and of elliptical or egg shape in cross section extending across said duct and opening through the side walls of said duct, said casing having a cross sectional area sufficient to permit removal of said motor within said casing from said supporting means.

5. In a ventilating system, the combination with an air duct, of a motor within said duct, a disc fan rotated by said motor, a frame surrounding said fan and provided with a supporting means for said motor, and a protecting casing formed within said duct supported between the side walls of said duct and on said supporting means so as not to interfere with the air stream created by said fan and preventing said air stream from contacting with said motor.

6. In a ventilating system, the combination with an air duct, of a motor within said duct, a disc fan rotated by said motor, a frame surrounding said fan having an extended portion for said motor and a protecting casing for said motor of elliptical or egg shape in cross section having sections removable for access to said motor and fitted around said extended portion, said casing having end portions opening through the side walls of said duct for permitting circulation of air therethrough to cool said motor.

GEORGE DE BOTHEZAT.